(12) United States Patent
Miftakhov (10) Patent No.: US 12,444,939 B2
(45) Date of Patent: Oct. 14, 2025

(54) SYSTEMS AND METHODS FOR INTEGRATED FUEL CELL STACK AND BATTERY MANAGEMENT FOR TRANSPORTATION USE

(71) Applicant: ZeroAvia, Inc., Hollister, CA (US)

(72) Inventor: Valery Miftakhov, San Carlos, CA (US)

(73) Assignee: ZeroAvia, Inc., Hollister, CA (US)

( * ) Notice: Subject to any disclaimer, the term of this patent is extended or adjusted under 35 U.S.C. 154(b) by 403 days.

(21) Appl. No.: 18/044,064

(22) PCT Filed: Sep. 9, 2021

(86) PCT No.: PCT/US2021/049635
§ 371 (c)(1),
(2) Date: Mar. 3, 2023

(87) PCT Pub. No.: WO2022/056107
PCT Pub. Date: Mar. 17, 2022

(65) Prior Publication Data
US 2023/0352936 A1    Nov. 2, 2023

Related U.S. Application Data

(60) Provisional application No. 63/076,382, filed on Sep. 10, 2020.

(51) Int. Cl.
*H02J 1/10* (2006.01)
(52) U.S. Cl.
CPC .............. *H02J 1/108* (2013.01); *H02J 1/102* (2013.01); *H02J 2300/30* (2020.01)
(58) Field of Classification Search
CPC ........ H02J 1/108; H02J 1/102; H02J 2300/30; F02K 5/00; Y02E 60/50; Y02T 90/40
See application file for complete search history.

(56) References Cited

U.S. PATENT DOCUMENTS 3,801,372 A    4/1974  Shaw
5,106,035 A    4/1992  Langford
(Continued)

FOREIGN PATENT DOCUMENTS

CN    201048143 Y    4/2008
DE    19821952 A1    11/1999
(Continued)

OTHER PUBLICATIONS

Cassir, M, et al "Electrochemical devices for energy; Fuel cells and electrolytic cells." Handbook of membrane reactors, Woodhead Publishing, 2013, 553-606 (2013) (54 pages).
(Continued)

*Primary Examiner* — Ziaul Karim
(74) *Attorney, Agent, or Firm* — Osha Bergman Watanabe & Burton LLP (57) ABSTRACT

An integrated fuel cell power delivery system includes a first power source configured to supply power to a propulsion inverter, a second power source configured to supply power to the propulsion inverter, a disconnect operably connected to the second power source, a bypass diode operably connected to the first power source and the second power source, a sensor that detects an output voltage of the integrated fuel cell power system, a processor, and a memory. The memory includes instructions stored thereon, which when executed by the processor, cause the integrated fuel cell power system to access a signal from the sensor, determine if the accessed first signal is greater than a first threshold voltage, and operably disconnect an output of the second power source to the integrated fuel cell power system by the disconnect based on the determination.

15 Claims, 4 Drawing Sheets

(56) References Cited

U.S. PATENT DOCUMENTS

| | | | |
|---|---|---|---|
| 5,810,284 | A | 9/1998 | Hibbs et al. |
| 6,119,979 | A | 9/2000 | Lee et al. |
| 6,322,915 | B1 | 11/2001 | Collins et al. |
| 6,380,637 | B1 | 4/2002 | Hsu et al. |
| 6,568,633 | B2 | 5/2003 | Dunn |
| 2001/0018138 | A1 | 8/2001 | Iwase |
| 2002/0005454 | A1 | 1/2002 | MacCready et al. |
| 2003/0096148 | A1 | 5/2003 | Edwards |
| 2004/0043267 | A1 | 3/2004 | Schuler et al. |
| 2004/0126635 | A1* | 7/2004 | Pearson .............. H01M 8/0488 429/430 |
| 2004/0228055 | A1* | 11/2004 | Pearson .................. H02J 7/345 361/93.1 |
| 2006/0093883 | A1 | 5/2006 | Pristash |
| 2007/0160887 | A1 | 7/2007 | Eickhoff |
| 2007/0254200 | A1 | 11/2007 | Takada et al. |
| 2008/0145716 | A1* | 6/2008 | Yu ..................... H01M 8/04089 429/444 |
| 2009/0212634 | A1* | 8/2009 | Kojima .................. B60L 58/20 307/77 |
| 2010/0261079 | A1 | 10/2010 | Kells et al. |
| 2010/0293959 | A1 | 11/2010 | Remy et al. |
| 2012/0189875 | A1 | 7/2012 | Fischel et al. |
| 2013/0026842 | A1* | 1/2013 | Arditi .................... H02J 13/00 307/43 |
| 2014/0047814 | A1 | 2/2014 | Steinwandel et al. |
| 2015/0357658 | A1 | 12/2015 | Kashyap et al. |
| 2016/0181641 | A1 | 6/2016 | Hoffjann et al. |
| 2017/0175565 | A1 | 6/2017 | Sennoun |
| 2017/0211474 | A1 | 7/2017 | Sennoun |
| 2018/0053950 | A1 | 2/2018 | Buehler et al. |
| 2018/0201142 | A1* | 7/2018 | Galin ........................ H02J 3/14 |
| 2018/0304753 | A1 | 10/2018 | Vondrell et al. |
| 2021/0043961 | A1 | 2/2021 | Itou et al. |
| 2021/0151783 | A1 | 5/2021 | Miftakhov |
| 2021/0155476 | A1 | 5/2021 | Futerman et al. |
| 2021/0218336 | A1* | 7/2021 | Shkoury .................. H02J 3/38 |
| 2021/0320353 | A1* | 10/2021 | Miftakhov ........ H01M 8/04888 |
| 2022/0325666 | A1 | 10/2022 | Miftakhov et al. |
| 2023/0028037 | A1 | 1/2023 | Miftakhov et al. |

FOREIGN PATENT DOCUMENTS

| | | | |
|---|---|---|---|
| EP | 2878795 | A1 | 6/2015 |
| EP | 3199791 | A1 | 8/2017 |
| JP | H11200888 | A | 7/1999 |
| JP | 2019-117792 | A | 7/2019 |
| KR | 20200064492 | A | 6/2020 |
| WO | 2022056107 | A1 | 3/2022 |

OTHER PUBLICATIONS

Office Action cited in Corresponding U.S. Appl. No. 16/950,735 mailed on Oct. 1, 2024 (32 pages).

ISA/EP, International Search Report and Written Opinion for International Application No. PCT/US2023/070460, 9 pages, Oct. 19, 2023.

Fernandes, et al., "SOFC-APU systems for aircraft: A review", International Journal of Hydrogen Energy 43.33, 2018, 16311-16333.

Ji, et al., "Thermodynamic analysis of a solid oxide fuel cell jet hybrid engine for long-endurance unmanned air vehicles", Energy Conversion and Management 183, 2019, 50-64.

Petrescu, et al., "Modern propulsions for aerospace—a review", Journal of Aircraft and Spacecraft Technology 1.1, 2017.

Song, et al., "Performance analysis of a tubular solid oxide fuel cell/micro gas turbine hybrid power system based on a quasi-two dimensional model.", Journal of Power Sources 142, 2005, 30-42.

Extended European Search Report for Application No. 20208430.7 dated Apr. 13, 2021.

ISA/EP, Search Report for International Application No. PCT/US21/49635, 11 pages, Dec. 3, 2021.

General Electric Aviation, "The Single-Spool Core: Aproven design for performance and simplicity", I901-white-paper.pdf, retrieved Jun. 15, 2022 https://web.archive.org/web/20170630095803/https://www.geaviation.com/sites/default/files/single-vs-dual-spool .pdf.

Thomas, et al., "Fuel Cells—Green Power", https://paginas.fe.up.pt/~mcnunes/QAE/documentos/fuelcells.pdf, Nov. 29, 2007, 1-36.

Zhixing, et al., "Comparative performance analysis of solid oxide fuel cell turbine-less jet engines for electric propulsion airplanes: Application of alternative fuel", Aerospace Science and Technology, Elsevier Masson, FR, vol. 93, Jul. 10, 2019.

Office Action issued in related U.S. Appl. No. 16/950,735 dated Jun. 20, 2024 (29 pages).

Hendrick, Patrick, et al. "Air-hydrogen heat exchangers for advanced space launchers." Journal of propulsion and power 25.6 (2009): 1211-1219 (9 pages).

Alhazmi, Nahla Eid. Thermal conductivity of proton exchange membrane fuel cell components. University of Leeds, 2014 (261 pages).

Office Action issue in related U.S. Appl. No. 17/669,327 dated Nov. 4, 2024 (37 pages).

* cited by examiner

SYSTEMS AND METHODS FOR INTEGRATED FUEL CELL STACK AND BATTERY MANAGEMENT FOR TRANSPORTATION USE

CROSS REFERENCE TO RELATED APPLICATIONS

This application is a continuation of International Patent Application number PCT/US21/49635, filed on Sep. 9, 2021, entitled "SYSTEMS AND METHODS FOR INTEGRATED FUEL CELL STACK AND BATTERY MANAGEMENT FOR TRANSPORTATION USE" by Valery Miftakhov, and assigned to the assignee of the present application, which is incorporated herein by reference in its entirety. International Patent Application number PCT/US21/4963 claims the benefit of U.S. Provisional Application Ser. No. 63/076,382, filed Sep. 10, 2020, the entire contents of which are incorporated by reference herein.

FIELD

This disclosure relates, in general, to clean energy-based air transportation systems technology and, more specifically, to systems and methods for integrated fuel cell stack and battery management for transportation use.

BACKGROUND

In a traditional fuel cell system used for transportation propulsion, a battery is used to provide power output bursts required by the application. For example, in a typical automotive application, a response time of 50 ms is desired to human throttle inputs, which is an order of magnitude faster than the fastest fuel cell systems today. The gap is bridged by the battery system that is constantly connected to the fuel cell generator via a complex controllable DC to DC converter that manages power flow between the fuel cell and the battery, and then the battery is connected to the propulsive system via another complex power conversion system.

In such a configuration, typical voltages of the fuel cell system and the buffer battery are limited to 200-250V due to the increasing cost and complexity of larger cell counts that would be required to support higher voltage. On the other hand, optimization of the propulsive part of the system (inverter+motor) demand higher voltages—typically 600-700V in today's high-performance propulsive systems. Therefore, a typical fuel cell architecture today deploys a boost converter to bring the voltage from 200-250V to 600-700V. Such a high boost ratio results in significant electrical stresses for all the power conversion components and relatively low efficiency of conversion.

Additionally, the voltage levels of the fuel cell stack output can vary by more than 2× between the no-load and full rated load states. This creates additional complexity in power electronics design. The overall outcome is usually an expensive heavy system, wasting up to 10% of the energy in heat output from power conversion electronics at maximum rated power.

SUMMARY

This disclosure is directed to methods and systems that substantially obviate one or more of the above and other problems associated with conventional technology.

In accordance with aspects, this disclosure is directed to a power generating system comprised of a hydrogen fuel cell and rechargeable battery connected in series to be used as a load-following system without the use of a DC to DC converter. A cathode air compressor of the hydrogen fuel cell is driven by an output of this power generation system. This system can include a predetermined arrangement of switches and bypass diodes wired in series, and an isolated DC to DC converter to charge the rechargeable battery with the hydrogen fuel cell. In one aspect, a method to limit the system output voltage is provided in which maximum voltage of downstream components are not exceeded.

In accordance with another aspect, this disclosure is directed to an integrated fuel cell stack and battery system. The system includes a first power source configured to supply power to a propulsion inverter, a second power source configured to supply power to the propulsion inverter, a disconnect operably connected to the second power source, a bypass diode operably connected to the first power source and/or the second power source, a sensor that detects an output voltage of the integrated fuel cell power system, a processor, and a memory. The bypass diode and the disconnect selectively provide power to the propulsion inverter by the first power source and/or the second power source. The memory includes instructions stored thereon, which when executed by the processor, cause the integrated fuel cell power system to access a signal from the sensor, determine if the accessed first signal is greater than a first threshold voltage, and operably disconnect an output of at least one of the first power source or the second power source to the integrated fuel cell power system by the disconnect based on the determination In aspects, the instructions, when executed by the processor, may further cause the integrated fuel cell power system to access the first signal from the sensor, determine if the accessed first signal is less than a second threshold voltage, and operably connect the output of the second power source to the integrated fuel cell power system by the disconnect based on the determination.

In aspects, the first power source may include a fuel cell stack and/or a battery.

In aspects, the second power source may include a fuel cell stack and/or a battery.

In aspects, the system may further include an electronic voltage limiting device configured to selectively provide a load on the first power source and/or second power source. The instructions, when executed by the processor, may further cause the integrated fuel cell power system to access the signal from the sensor, determine if the accessed first signal is greater than a third threshold voltage, and selectively provide a load, by the electronic voltage limiting device, to the first power source and/or second power source based on the determination.

In aspects, the voltage limiting device may include a calibrated load configured to load the output of the system in a case where the output voltage exceeds the predetermined third threshold voltage.

In aspects, the electronic voltage limiting device may include a field-effect transistor (FET).

In aspects, the system may further include a cathode air compressor configured to be powered by the first power source and/or the second power source.

According to yet another aspect, the disclosure is directed to an integrated fuel cell power delivery system including a first power source configured to supply power to a propulsion inverter, a second power source configured to supply power to the propulsion inverter, an electronic voltage limiting device configured to selectively provide a load on the first power source and/or second power source, a sensor that detects an output voltage of the integrated fuel cell power system, a processor, and a memory. The memory includes instructions stored thereon, which when executed by the processor, cause the integrated fuel cell power system to access a signal from the sensor, determine if the accessed first signal is greater than a threshold voltage, and selectively provide a load, by the electronic voltage limiting device, to the first power source and/or second power source based on the determination In aspects, the voltage limiting device may include a calibrated load configured to load the output of the system in a case where the output voltage exceeds the predetermined threshold.

In aspects, the voltage limiting device may include a field effect transistor (FET).

In aspects, the system may further include a cathode air compressor configured to be powered by the first power source and/or the second power source.

In aspects, the first power source may include a fuel cell stack and/or a battery.

In aspects, the second power source may include a fuel cell stack and/or a battery.

According to yet another aspect, the disclosure is directed to a computer-implemented method for integrated fuel cell stack and battery management including accessing a signal from a sensor, the sensor configured to detect an output voltage of a first power source and/or a second power source, either individually or in series, determining if the accessed sensor signal is greater than a first threshold voltage, and operably disconnecting the output of the second power source by a power source disconnect based on the determination. The power source disconnect is operably connected to the first power source and the second power source. A plurality of bypass diodes and the power source disconnect are configured to selectively provide power to a propulsion inverter by the first power source and/or the second power source, either individually or simultaneously.

In aspects, the method may further include accessing the signal from the sensor, determining if the accessed first signal is less than a second threshold voltage, and operably connecting the output of the second power source to the integrated fuel cell power system by the disconnects based on the determination.

In aspects, the first power source may include a fuel cell stack and/or a battery. The second power source may include a fuel cell stack and/or a battery.

In aspects, the method may further include accessing the first signal from the sensor, determining if the accessed first signal is greater than a second threshold voltage, and selectively providing a load, by an electronic voltage limiting device, to the first power source and/or second power source based on the determination. The electronic voltage limiting device may be configured to selectively provide a load on at the first power source and/or second power source.

In aspects, the voltage limiting device may include a calibrated load configured to load the output of the system in a case where the output voltage exceeds the predetermined second threshold voltage.

In aspects, the voltage limiting device may include a field-effect transistor (FET).

Additional aspects related to this disclosure are set forth, in part, in the description which follows, and, in part, will be obvious from the description or may be learned by practice of this disclosure.

It is to be understood that both the foregoing and the following descriptions are exemplary and explanatory only and are not intended to limit the claimed disclosure or application thereof in any manner whatsoever.

BRIEF DESCRIPTION OF THE DRAWINGS

The accompanying drawings, which are incorporated in and constitute a part of this specification, exemplify the aspects of the present disclosure and, together with the description, explain and illustrate the principles of this disclosure.

DETAILED DESCRIPTION

In the following detailed description, reference will be made to the accompanying drawing(s), in which identical functional elements are designated with like numerals. The accompanying drawings show by way of illustration, and not by way of limitation, specific aspects, and implementations consistent with principles of this disclosure. These implementations are described in sufficient detail to enable those skilled in the art to practice the disclosure, and it is to be understood that other implementations may be utilized and that structural changes and/or substitutions of various elements may be made without departing from the scope and spirit of this disclosure. The following detailed description is, therefore, not to be construed in a limited sense.

Figure 1:
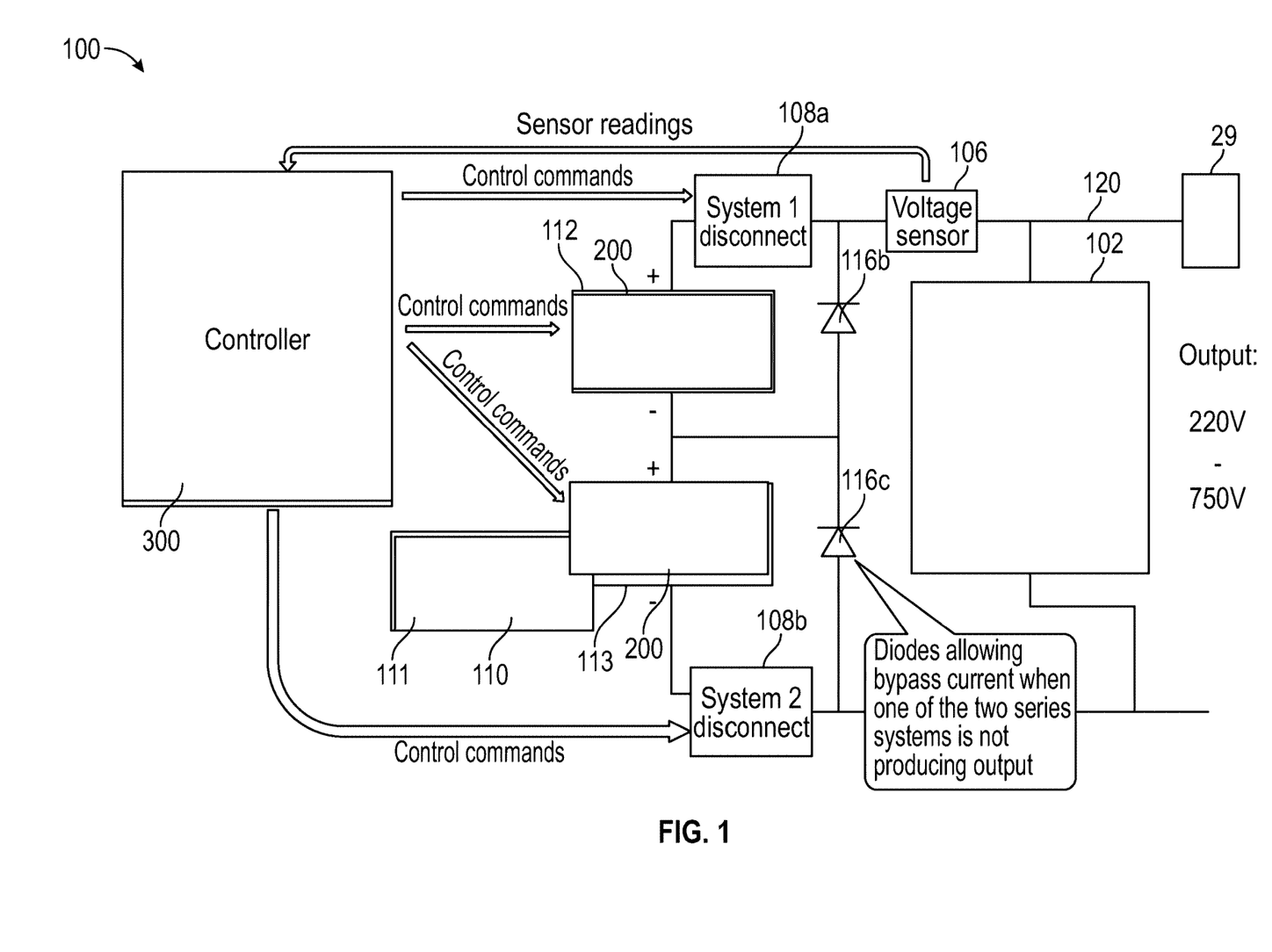
FIG. 1 is a schematic illustration of a hydrogen fuel cell-electric engine system.
Figure 3:
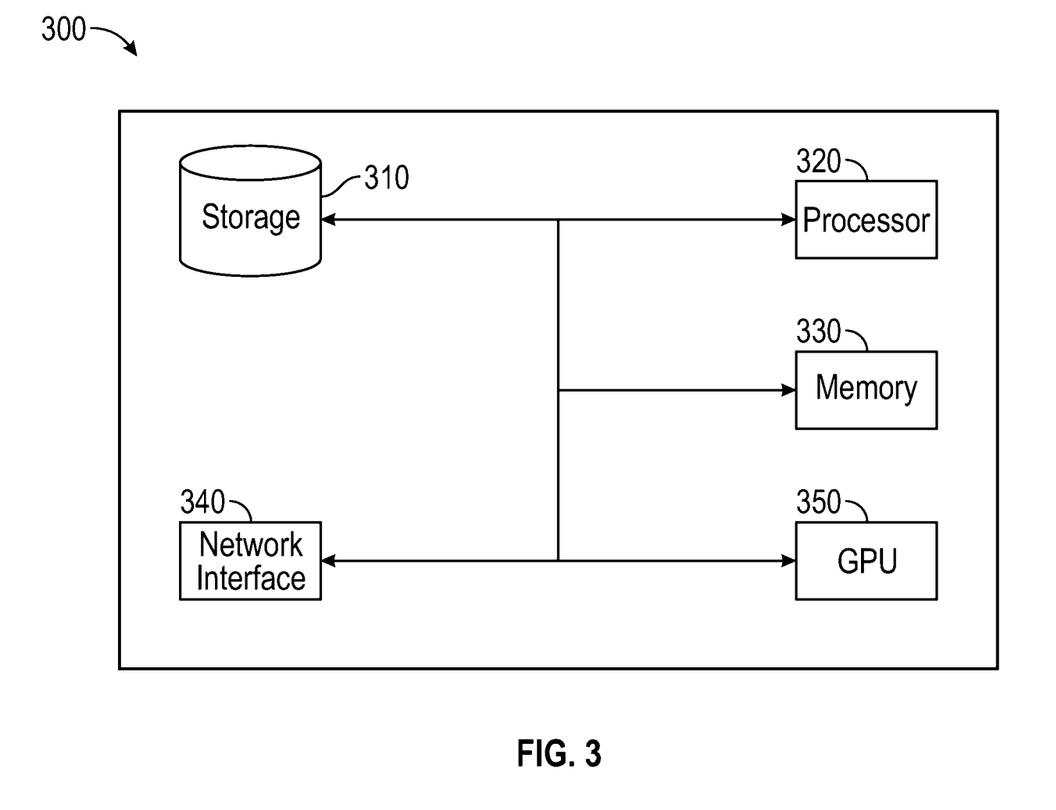
FIG. 3 is a block diagram of a controller configured for use with the integrated hydrogen-electric engine system of FIG. 1.

Referring to FIG. 1, the integrated fuel cell power delivery system 100 generally includes a first power source 112 (e.g., the fuel cell system 200 and/or battery 111) connected substantially in series with a second power source 113, with individual disconnects 108a, 108b, and with bypass diodes 116b, 116c allowing the power flow even when the battery 111 or the fuel cell system 200 is selectively disconnected by the power source disconnect 108a, 108b. High-quality bypass diodes 116b, 116c are inexpensive and light, and at typical 250V fuel cell stack (e.g., fuel cell system 200)/battery 111 voltage levels, the bypass diodes 116b, 116c may result in only about 0.3-0.5% losses in the system, compared to the state of the art system losses of up to about 10%, with the corresponding improvement in the complexity and weight of cooling systems for such a powertrain. The integrated fuel cell power delivery system 100 may include a controller 300 (FIG. 3).

The integrated fuel cell power delivery system 100, may further include an isolated DC to DC converter configured to charge the battery 111 with excess power from the fuel cell system 200.

Furthermore, the integrated fuel cell power delivery system 100 also contains an output voltage sensor 106, an electronic voltage limiting device 102 (e.g., a field-effect transistor (FET)), that work together with the controller 300 to prevent overvoltage on the output of the integrated fuel cell power delivery system 100. The electronic voltage limiting device 102 may include, for example, a calibrated load/power resistor that is designed to load the output of the integrated fuel cell power delivery system 100 if the output voltage of the integrated fuel cell power delivery system 100 exceeds a predetermined value. For example, the voltage sensor 106 may detect an output voltage of the integrated fuel cell power delivery system 100, and the electronic voltage limiting device 102 may open above a source-drain voltage of about 790V and switch in the electronic voltage limiting device 102 (e.g., the calibrated load) to provide sufficient load on the fuel cell system 200 to avoid overvoltage of the output voltage of the of the integrated fuel cell power delivery system 100, sufficient to manage most transient conditions (e.g., sudden load drop, before the controller 300 is able to reduce the fuel cell stack 200 and/or battery 111 output). Due to the typical characteristics of fuel cells, a relatively small load (e.g., 1% of the max power rating of the fuel cell) will result in a very significant voltage drop relative to the open-circuit voltage of the output of the integrated fuel cell power delivery system 100. The dissipated power across the load provided by the electronic voltage limiting device 102 can be redirected and used for useful purposes (e.g., heating of the passenger compartment, battery recharge, etc.).

Finally, the controller 300 reads the sensors, conducts necessary calculations, and produces commands delivered to the fuel cell system 200, power source disconnects 108a, 108b, and the electronic voltage limiting device 102.

In one or more aspects, the proposed connection approach for the battery 111 and fuel cell system 200 results in the output voltage high enough to operate the propulsive system without an intermediate booster, yet without a possibility of overvoltage.

For example, the controller 300 connects the battery 111 to the output of the integrated fuel cell power delivery system 100 only when the peak/high output power of the integrated fuel cell power delivery system 100 is required. An example of a perfect application is an aircraft powertrain, where peak power is needed only on takeoff, while in cruise, only 50-70% of the peak power is required. In the case of such a power profile, the controller 300 connects the battery 111 into the circuit only for the takeoff and initial climb, producing full output voltage and power. Once the initial climb is complete, the power source disconnects the battery 111, and the powertrain operates on just a fuel cell system 200 at a steady output equivalent to 50-70% of the max system power rating.

The battery 111 can be optionally recharged from the fuel cell 200 via an isolated DC to DC converter 110. Such DC to DC converter 110 would require a much lower power rating than the original booster converter and, therefore would be significantly cheaper and lighter. The overall system weight optimization can be achieved through balancing the battery 111 capacity (and therefore weight) and the converter power rating.

In aspects, a hydrogen fuel cell cathode air compressor 118 can be powered solely by battery power.

For instance, before hydrogen and oxygen are supplied to the anode and cathode of the hydrogen fuel cell system 200, the cathode air compressor 118 can be powered to bring up the hydrogen fuel cell voltage before closing the system power source disconnect 108b (see FIG. 1).

In aspects, the hydrogen fuel cell cathode air compressor 118 can be powered solely by the hydrogen fuel cell power while the system load is driven by the battery 111 and fuel cell system 200 in series.

Figure 2:
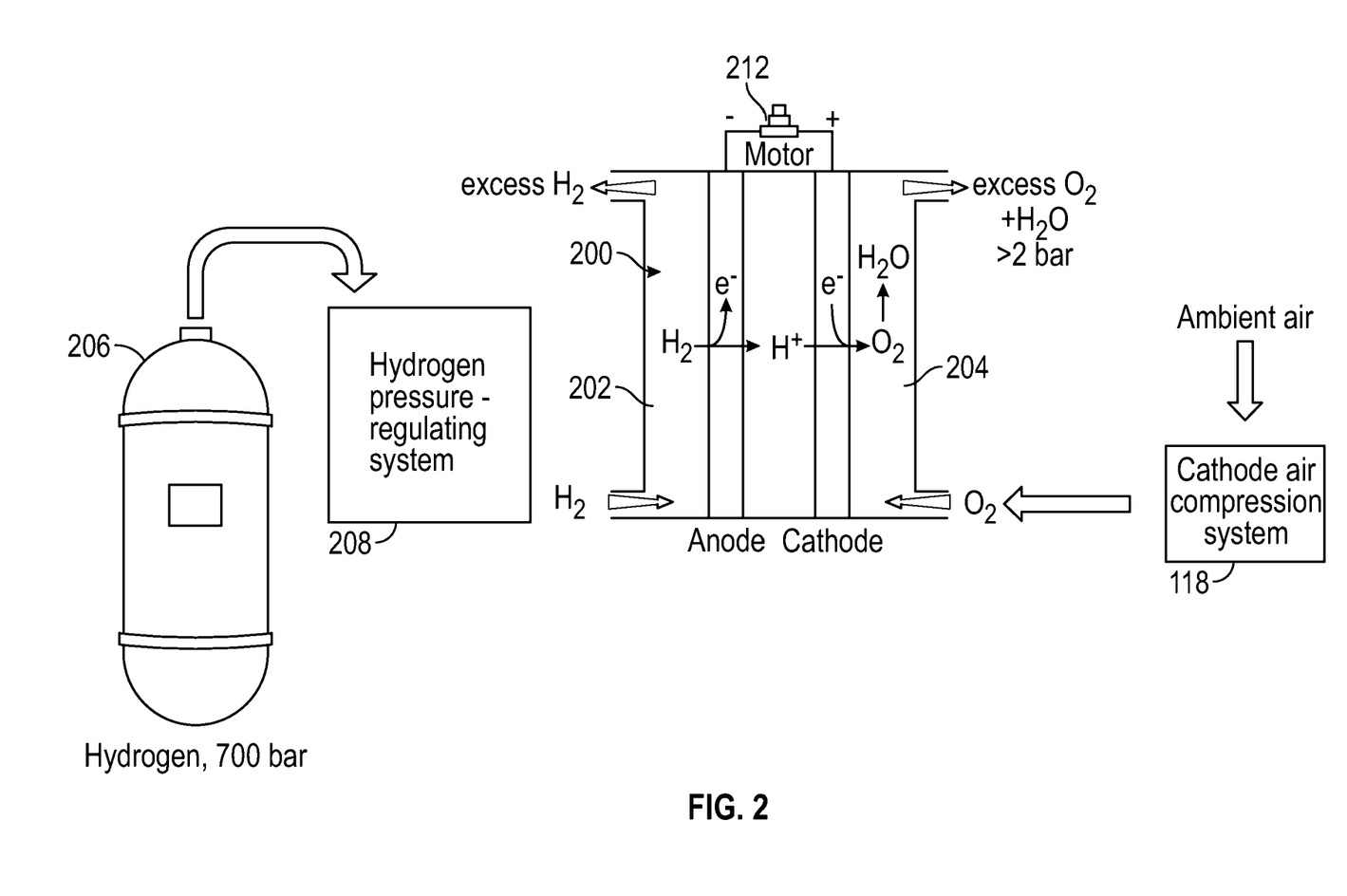
FIG. 2 is a schematic view of a fuel cell of the integrated hydrogen-electric engine system of FIG. 1.

For example, to reduce the energy required to recharge the battery 111, the battery 111 may be bypassed with a single-pole double-throw relay 122 (controlled by controller 300) on the positive end of the cathode air compressor 118 (FIG. 2). Bypassing the battery 111 in this manner the power reserves of the system to be extended as much as possible (see FIG. 1).

In aspects, the hydrogen fuel cell cathode air compressor 118 can be powered off the fuel cell system 200 and/or the rechargeable battery 111 in series.

For instance, to run the cathode air compressor 118 efficiently and at full power the cathode air compressor 118 can be driven on the combined battery 111 and fuel cell voltage of fuel cell system 200 using the integrated fuel cell power delivery system 100 detailed in FIG. 1. By closing both the battery and power source disconnects 108a, 108b, and not bypassing the battery 111 with the double pole single throw relay 122, the combined voltage may be supplied to the cathode air compressor 118 (see FIG. 1).

In aspects, the hydrogen fuel cell cathode air compressor 118 can be started by the rechargeable battery 111 and transitioned to be run by the rechargeable battery 111 and fuel cell system 200 in series.

For example, the integrated fuel cell power delivery system 100 can start with the power source disconnect 108a open, effectively removing the fuel cell system 200 from the circuit, and allowing current to pass through the a bypass diode 116b, 116c. Power is applied to the cathode air compressor 118, voltage is then present across the fuel cell system 200, and then the power source disconnect 108a is closed to bring the integrated fuel cell power delivery system 100 to the full combined stack voltage (see FIG. 1).

In aspects, the fuel cell system 200 can charge the rechargeable battery 111 via an isolated DC to DC converter 110.

For example, when excess power is available from the fuel cell system 200, the isolated DC to DC converter 110 can charge the battery 111 to extend the range of the integrated fuel cell power delivery system 100. This is desirable because hydrogen has a significant energy density advantage over the currently available battery technologies (see FIG. 1).

In aspects, the isolated DC to DC converter 110 may be configured to convert the approximately 300V fuel cell to an approximately 700V combined stack voltage if connected as an additive DC to DC converter.

In aspects, the electronic voltage limiting device 102 can be used such that the combined battery 111 and fuel cell system 200 output voltage cannot exceed a specified high voltage limit.

For instance, a power resistor and a FET opening above 790V source-drain voltage can be utilized to provide sufficient load on the fuel cell to avoid overvoltage of the output supply—sufficient to manage most transient situations (e.g., sudden load drop, before the controller 300 is able to reduce the fuel cell output).

In aspects, this disclosure describes a method to remove the battery 111 if the battery is no longer desirable.

For example, if the battery 111 is depleted or no longer desired, it can be taken out of the circuit by opening the power source disconnect 108a, 108b (see FIG. 1). The integrated fuel cell power delivery system power will then flow through the battery bypass diode keeping the integrated fuel cell power delivery system 100 powered.

With reference to FIG. 2, the fuel cell system 200 of integrated fuel cell power delivery system 100, which may be circular, can be coaxially supported on elongated shaft (e.g., concentric, not shown) of a powertrain of an integrated hydrogen-electric engine system of an aircraft (not shown), such that air channels 202 of fuel cell system 200 may be oriented in parallel relation with elongated shaft (e.g., horizontally, or left-to-right). Fuel cell system 200 may be in the form of a proton-exchange membrane fuel cell (PEMFC). The fuel cells of the fuel cell system 200 are configured to convert chemical energy liberated during the electrochemical reaction of hydrogen and oxygen to electrical energy (e.g., direct current). Depleted air and water vapor are exhausted from fuel cell system 200. The electrical energy generated from fuel cell system 200 is then transmitted to a motor assembly (not shown), which is also coaxially/concentrically supported on elongated shaft (not shown). In aspects, integrated fuel cell power delivery system 100 may include any number of external radiators (not shown) for facilitating airflow and adding, for instance, additional cooling. Notably, fuel cell system 200 can include liquid-cooled and/or air-cooled cell types so that cooling loads are integrated into heat exchangers (not shown) for reducing total amount of external radiators needed in the system.

In aspects, the fuel cell system 200 may include a fuel cell cathode air compressor 118 configured to supply air to the fuel cell system 200, a hydrogen fuel source 206 configured to supply hydrogen to the fuel cell system 200, and a hydrogen pressure regulating system 208 configured to regulate the hydrogen from the hydrogen fuel source 206 to the fuel cell system 200.

Finally, the processes and techniques described herein are not inherently related to any particular apparatus and may be implemented by any suitable combination of components. Further, various types of general-purpose devices may be used in accordance with the teachings described herein. It may also prove advantageous to construct specialized apparatus to perform the method steps described herein. This disclosure has been described in relation to the examples, which are intended in all respects to be illustrative rather than restrictive.

FIG. 3 illustrates that controller 300 includes a processor 320 connected to a computer-readable storage medium or a memory 330. The computer-readable storage medium or memory 330 may be a volatile type of memory, e.g., RAM, or a non-volatile type of memory, e.g., flash media, disk media, etc. In various aspects of the disclosure, the processor 320 may be another type of processor such as, without limitation, a digital signal processor, a microprocessor, an ASIC, a graphics processing unit (GPU), a field-programmable gate array (FPGA), or a central processing unit (CPU). In certain aspects of the disclosure, network inference may also be accomplished in systems that have weights implemented as memristors, chemically, or other inference calculations, as opposed to processors.

In aspects of the disclosure, the memory 330 can be a random access memory, read-only memory, magnetic disk memory, solid-state memory, optical disc memory, and/or another type of memory. In some aspects of the disclosure, the memory 330 can be separate from the controller 300 and can communicate with the processor 320 through communication buses of a circuit board and/or through communication cables such as serial ATA cables or other types of cables. The memory 330 includes computer-readable instructions that are executable by the processor 320 to operate the controller 300. In other aspects of the disclosure, the controller 300 may include a network interface 340 to communicate with other computers or to a server. A storage device 310 may be used for storing data.

The disclosed method may run on the controller 300 or on a user device, including, for example, on a mobile device, an IoT device, or a server system. The controller 300 is configured to receive among other data, the fuel supply status, aircraft location, and control, among other features, the pumps, motors, sensors, etc.

Further, as can be appreciated, the integrated hydrogen-electric engine system 100 can include any number and/or type of sensors, electrical components, and/or telemetry devices that are operatively coupled to controller 300 for facilitating the control, operation, and/or input/out of the various components of integrated hydrogen-electric engine system 100 for improving efficiencies and/or determining errors and/or failures of the various components.

Figure 4:
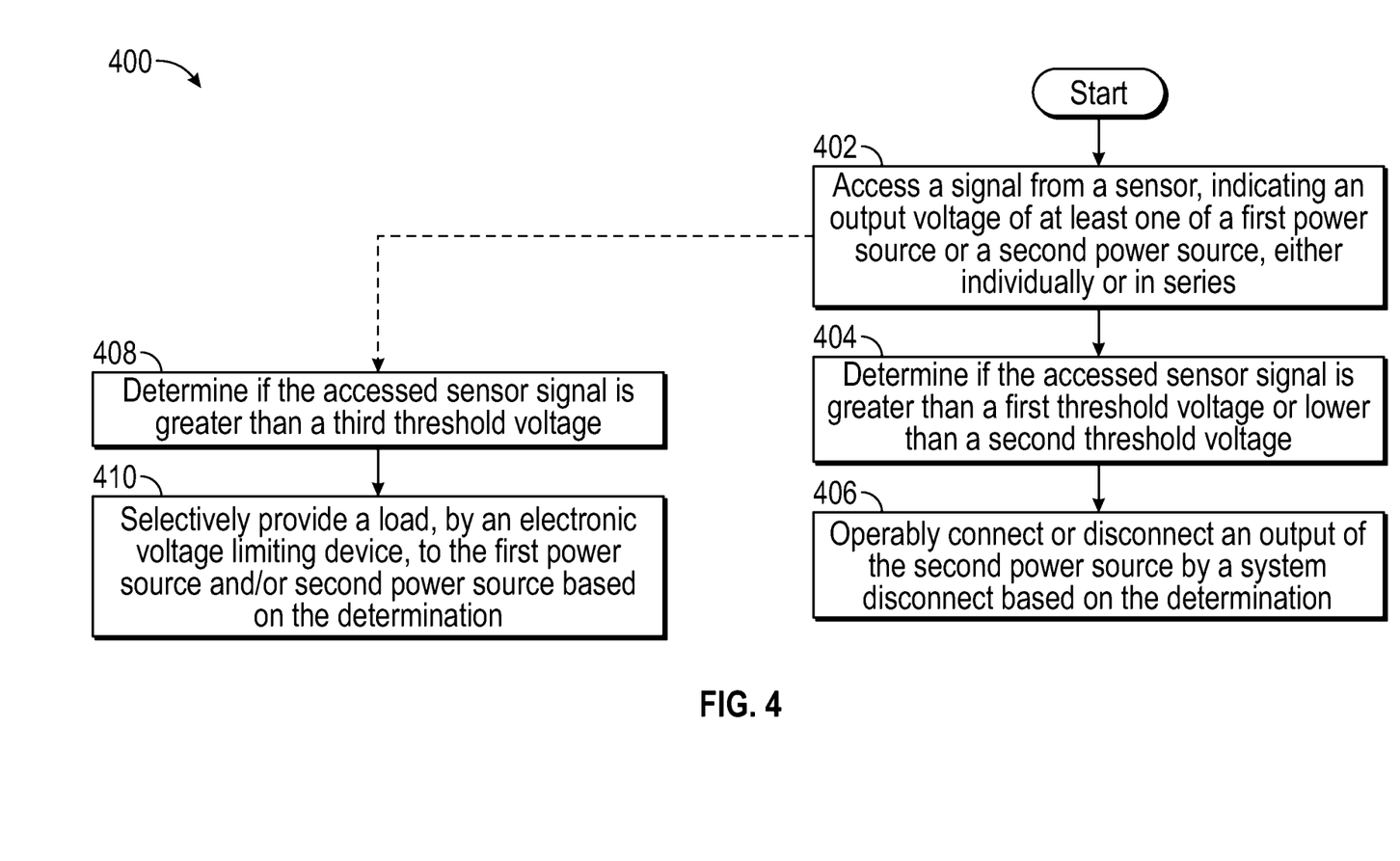
FIG. 4 is a block diagram of a computer-controlled method for integrated fuel cell stack and battery management for use with the integrated hydrogen-electric engine system of FIG. 1.

Referring to FIG. 4, there is shown a flow chart of an exemplary computer-implemented method 400 for integrated fuel cell stack and battery management in accordance with aspects of the present disclosure. Although the steps of FIG. 4 are shown in a particular order, the steps need not all be performed in the specified order, and certain steps can be performed in another order. For simplicity, FIG. 4 will be described below, with the controller 300 performing the operations. However, in various aspects, the operations of FIG. 4 may be performed in part by the controller 300 of FIG. 3 and in part by another device, such as a remote server. These variations are contemplated to be within the scope of the present disclosure.

Initially, at step 402, the controller 300 accesses a signal from a sensor configured to detect an output voltage of a first power source 112 or a second power source 113 (either individually or in series) of the integrated fuel cell power delivery system 100 of FIG. 1.

The first power source 112 and/or the second power source 113 may include any combination of fuel cell systems 200 and/or batteries 111. For example, the first power source 112 may include a fuel cell system 200, and the second power source 113 may include the battery 111.

Next, at step 404, the controller 300 determines if the accessed sensor signal is greater than a first threshold voltage (e.g., about 750 Volts).

Next, at step 406, the controller 300 operably disconnects an output of the second power source 113 by the power source disconnect(s) 108a, 108b, based on the determination that sensed voltage is greater than the first threshold voltage. For example, if the sensed voltage measures about 789 Volts, then the controller would determine that this is greater than the threshold of about 750 Volts and would disconnect the power source disconnect(s) 108a, 108b, to disconnect the output of the second power source 113 to reduce the system output voltage. The power source disconnect(s) 108a, 108b, may be operably connected to the first power source and/or the second power source 113. The plurality of bypass diodes 116b and 116c and the power source disconnect(s) 108a, 108b, are configured to selectively provide power to a propulsion inverter 29 by at least one of the first power source 112 or the second power source 113, either individually or simultaneously.

In aspects, the first power source 112 and/or the second power source 113 may power the cathode air compressor 118, which is operably connected to outputs of the integrated fuel cell power system 100.

In aspects, the controller 300 may determine if the accessed first signal is less than a second threshold voltage. In aspects, the controller 300 may operably connect the output of the second power source 113 to the integrated fuel cell power system 100 by the disconnects based on the determination. For example, if the sensed voltage is about 300 volts and the second threshold voltage is about 500 volts, then the controller 300 would operably connect the output of the second power source 113 to the integrated fuel cell power system 100.

In aspects, at step 408, the controller 300 may determine if the accessed first signal is greater than a third threshold voltage (e.g., about 725 Volts). Next, at step 410, the controller 300 selectively provides a load, by an electronic voltage limiting device 102, to the first power source and/or second power source based on the determination the sensed voltage is greater than the third threshold voltage. The electronic voltage limiting device 102 is configured to selectively provide a load on at least one of the first power source 112 and/or second power source 113.

In aspects, the electronic voltage limiting device 102, may include a field-effect transistor (FET) and/or a precision resistor. For example, to handle transient situations, the electronic voltage limiting device 102 (e.g., the FET) may open above about 725 volts to provide a sufficient load on the first power source 112 and/or second power source 113 to avoid overvoltage of the output of the integrated fuel cell power system 100. The electronic voltage limiting device 102 may include a calibrated load configured to load the output of the integrated fuel cell power system 100 in a case where the output voltage exceeds the predetermined third threshold voltage.

Persons skilled in the art will understand that the structures and methods specifically described herein and shown in the accompanying figures are non-limiting exemplary aspects, and that the description, disclosure, and figures should be construed merely as exemplary of particular aspects. It is to be understood, therefore, that this disclosure is not limited to the precise aspects described, and that various other changes and modifications may be effectuated by one skilled in the art without departing from the scope or spirit of the disclosure. Additionally, the elements and features shown or described in connection with certain aspects may be combined with the elements and features of certain other aspects without departing from the scope of this disclosure, and that such modifications and variations are also included within the scope of this disclosure. Accordingly, the subject matter of this disclosure is not limited by what has been particularly shown and described.

What is claimed is:

1. An integrated fuel cell power delivery system, the system comprising:
    a first power source configured to supply power to a propulsion inverter;
    a second power source configured to supply power to the propulsion inverter;
    a disconnect operably connected to the second power source;
    a bypass diode operably connected to the first power source and the second power source,
    wherein the bypass diode and the disconnect selectively provides power to the propulsion inverter by at least one of the first power source or the second power source;
    a sensor that detects an output voltage of the integrated fuel cell power system;
    a processor; and
    a memory, which includes instructions stored thereon, which when executed by the processor, cause the integrated fuel cell power system to:
        access a first signal from the sensor;
        determine if the accessed first signal is greater than a first threshold voltage; and
        operably disconnect an output of at least one of the first power source or the second power source to the integrated fuel cell power system by the disconnect based on the determination;
    the system further comprising an electronic voltage limiting device configured to selectively provide a load on at least one of the first power source or second power source;
    wherein the instructions, when executed by the processor, further cause the integrated fuel cell power system to:
        access the signal from the sensor;
        determine if the accessed first signal is greater than a third threshold voltage; and
        selectively provide a load, by the electronic voltage limiting device, to at least one of the first power source or second power source based on the determination,
        wherein the voltage limiting device includes a calibrated load configured to load the output of the integrated fuel cell power system in a case where the output voltage exceeds the predetermined third threshold voltage.

2. The system according to claim 1, wherein the instructions, when executed by the processor, further cause the integrated fuel cell power system to:
    access the first signal from the sensor;
    determine if the accessed first signal is less than a second threshold voltage; and
    operably connect the output of the second power source to the integrated fuel cell power system by the disconnect based on the determination.

3. The system according to claim 1, wherein the first power source includes at least one of a fuel cell stack or a battery.

4. The system according to claim 1, wherein the second power source includes at least one of a fuel cell stack or a battery.

5. The system according to claim 1, wherein the electronic voltage limiting device includes a field effect transistor (FET).

6. The system according to claim 1, further comprising a cathode air compressor configured to be powered by at least one of the first power source or the second power source.

7. An integrated fuel cell power delivery system, the system comprising:
    a first power source configured to supply power to a propulsion inverter;
    a second power source configured to supply power to the propulsion inverter;
    an electronic voltage limiting device configured to selectively provide a load on at least one of the first power source or second power source;
    a sensor that detects an output voltage of the integrated fuel cell power system;
    a processor; and
    a memory, which includes instructions stored thereon, which when executed by the processor, cause the integrated fuel cell power system to:
        access a first signal from the sensor;
        determine if the accessed first signal is greater than a threshold voltage; and
        selectively provide a load, by the electronic voltage limiting device, to at least one of the first power source or second power source based on the determination;
    the system further comprising an electronic voltage limiting device configured to selectively provide a load on at least one of the first power source or second power source;
    wherein the instructions, when executed by the processor, further cause the integrated fuel cell power system to:

access the signal from the sensor;
determine if the accessed first signal is greater than a third threshold voltage; and
selectively provide a load, by the electronic voltage limiting device, to at least one of the first power source or second power source based on the determination,
wherein the voltage limiting device includes a calibrated load configured to load the output of the integrated fuel cell power system in a case where the output voltage exceeds the predetermined third threshold voltage.

8. The system according to claim 7, wherein the voltage limiting device includes a field effect transistor (FET).

9. The system according to claim 7, further comprising a cathode air compressor configured to be powered by at least one of the first power source or the second power source.

10. The system according to claim 7, wherein the first power source includes at least one of a fuel cell stack or a battery.

11. The system according to claim 7, wherein the second power source includes at least one of a fuel cell stack or a battery.

12. A computer-implemented method for integrated fuel cell stack and battery management, the method comprising:
accessing a signal from a sensor, the sensor configured to detect an output voltage of at least one of a first power source or a second power source, either individually or in series;
determining if the accessed sensor signal is greater than a first threshold voltage; and
operably disconnecting an output of the second power source by a power source disconnect based on the determination,
wherein the power source disconnect is operably connected to the second power source,
wherein a plurality of bypass diodes and the power source disconnect are configured to selectively provide power to a propulsion inverter by at least one of the first power source or the second power source, either individually or simultaneously;
accessing the signal from the sensor;
determining if the accessed signal is greater than a third threshold voltage; and selectively providing a load, by an electronic voltage limiting device, to at least one of the first power source or second power source based on the determination,
wherein the electronic voltage limiting device is configured to selectively provide a load on at least one of the first power source or second power source, and
wherein the voltage limiting device includes a calibrated load configured to load the output of the integrated fuel cell power system in a case where the output voltage exceeds the predetermined second threshold voltage.

13. The computer-implemented method according to claim 12, further comprising:
accessing the signal from the sensor;
determining if the accessed first signal is less than a second threshold voltage; and
operably connecting the output of the second power source to the integrated fuel cell power system by the disconnects based on the determination.

14. The computer-implemented method according to claim 12, wherein the first power source includes at least one of a fuel cell stack or a battery, and wherein the second power source includes at least one of a fuel cell stack or a battery.

15. The system according to claim 12, wherein the voltage limiting device includes a field effect transistor (FET).

* * * * *